(12) United States Patent
Eguchi

(10) Patent No.: US 11,039,038 B2
(45) Date of Patent: Jun. 15, 2021

(54) IMAGE PROCESSING WITH CORRECTIONS FOR SPACED-APART GRADATION VALUES OF GRAYSCALE DATA

(71) Applicant: CANON KABUSHIKI KAISHA, Tokyo (JP)

(72) Inventor: Kimimori Eguchi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/834,434

(22) Filed: Mar. 30, 2020

(65) Prior Publication Data
US 2020/0322503 A1   Oct. 8, 2020

(30) Foreign Application Priority Data
Apr. 8, 2019   (JP) .............................. JP2019-073266

(51) Int. Cl.
*H04N 1/60* (2006.01)
*H04N 1/40* (2006.01)

(52) U.S. Cl.
CPC ....... *H04N 1/6027* (2013.01); *H04N 1/40012* (2013.01); *H04N 1/6008* (2013.01); *H04N 1/6016* (2013.01)

(58) Field of Classification Search
None
See application file for complete search history.

(56) References Cited

U.S. PATENT DOCUMENTS

| | | | |
|---|---|---|---|
| 8,253,981 B2 | 8/2012 | Eguchi | ........................... 358/3.1 |
| 8,416,460 B2 | 4/2013 | Eguchi | ........................ 358/3.26 |
| 9,619,873 B2 * | 4/2017 | Tsuda | ...................... G06T 5/009 |
| 10,542,188 B2 | 1/2020 | Shimamura et al. | ........................ H04N 1/6025 |
| 10,643,318 B2 * | 5/2020 | Yazawa | ................... G06T 5/009 |
| 10,771,657 B2 * | 9/2020 | Doi | ..................... G06K 15/1878 |
| 2004/0080789 A1 * | 4/2004 | Anderson | .......... H04N 1/40012 358/2.1 |
| 2008/0117466 A1 * | 5/2008 | Park | .................... H04N 1/40012 358/3.03 |
| 2008/0137148 A1 * | 6/2008 | Oh | ..................... H04N 1/40012 358/3.23 |
| 2008/0247642 A1 | 10/2008 | Eguchi | .......................... 382/167 |
| 2009/0052774 A1 * | 2/2009 | Yoshii | ...................... H04N 9/69 382/167 |
| 2010/0208985 A1 * | 8/2010 | Lee | .................... H04N 1/40012 382/163 |

(Continued)

FOREIGN PATENT DOCUMENTS

JP   2017-038242   2/2017

*Primary Examiner* — Dung D Tran
(74) *Attorney, Agent, or Firm* — Venable LLP

(57) ABSTRACT

The disclosed technique is an image processing apparatus that corrects gradation values of monochrome data converted from color data, including correction unit configured to, in the case where there are three or more gradation values after conversion and there are a plurality of gradation value differences between adjacent gradation values arranged in order of magnitude, if there is a gradation value difference smaller than a prescribed threshold value among the plurality of gradation value differences, correct the gradation value difference smaller than the threshold value to increase in the range of the threshold value or smaller by reducing other gradation value differences adjacent to the gradation value difference smaller than the threshold value.

18 Claims, 12 Drawing Sheets

(56) References Cited

U.S. PATENT DOCUMENTS

| | | | |
|---|---|---|---|
| 2012/0206747 A1* | 8/2012 | Park | H04N 1/40012 |
| | | | 358/1.9 |
| 2018/0124285 A1 | 5/2018 | Eguchi | H04N 1/6019 |
| 2020/0177764 A1* | 6/2020 | Sugahara | H04N 1/40012 |
| 2020/0296254 A1* | 9/2020 | Kanamori | H04N 1/409 |

* cited by examiner

| INPUT IMAGE | | | |
|---|---|---|---|
| | R | G | B |
| 506 | 255 | 0 | 0 |
| 507 | 146 | 208 | 80 |
| 508 | 255 | 192 | 0 |

FIG.7A

700 COLOR VALUE LIST

| Index | R | G | B |
|---|---|---|---|
| 1 | 255 | 255 | 255 |
| 2 | 146 | 208 | 80 |
| 3 | 255 | 192 | 0 |
| 4 | 0 | 0 | 0 |
| 5 | 255 | 0 | 0 |

FIG.7B

700 COLOR VALUE LIST

| Index | R | G | B | 701 GRAY VALUE | 707 CORRECTED GRAY VALUE |
|---|---|---|---|---|---|
| 1 | 255 | 255 | 255 | 255 | 255 |
| 2 | 146 | 208 | 80 | 175 | 164 |
| 3 | 255 | 192 | 0 | 189 | 196 |
| 4 | 0 | 0 | 0 | 0 | 0 |
| 5 | 255 | 0 | 0 | 76 | 76 |

FIG.7C

700' COLOR VALUE LIST SORTED IN ORDER OF GRAY VALUE / 703 GRAY VALUE DIFFERENCE LIST

| Index | R | G | B | 702 GRAY VALUE | GRAY VALUE DIFFERENCE INDEX | GRAY VALUE DIFFERENCE | 705 CORRECTED GRAY VALUE DIFFERENCE | 706 CORRECTED GRAY VALUE |
|---|---|---|---|---|---|---|---|---|
| 1 | 255 | 255 | 255 | 255 | | | | 255 |
| 3 | 255 | 192 | 0 | 189 | 1 | 66 | 59 | 196 |
| 2 | 146 | 208 | 80 | 175 | 2 | 14 | 32 | 164 |
| 5 | 255 | 0 | 0 | 76 | 3 | 99 | 88 | 76 |
| 4 | 0 | 0 | 0 | 0 | 4 | 76 | 76 | 0 |

IMAGE PROCESSING WITH CORRECTIONS FOR SPACED-APART GRADATION VALUES OF GRAYSCALE DATA

BACKGROUND OF THE INVENTION

Field of the Invention

The present invention relates to an image processing technique that performs color conversion processing.

Description of the Related Art

In recent years, in general offices, documents and presentation documents are created in full color, but when those documents are printed, they are often printed in monochrome (monochrome black). When printing color documents in monochrome in this manner, a process of converting color data into grayscale data is required. In such a conversion process, when color data of a manuscript is represented by RGB values, it is usually converted by a method called NTSC conversion.

In the NTSC conversion, a value obtained by weighting and combining 0.299 R+0.587 G+0.114 B for each brightness with respect to an RGB value is set as a gray value corresponding to the RGB value. In this method, however, there is a problem in which even if combinations of respective brightness values of RGB values are different, weighted and combined values may match, and discrimination between elements that were color-coded on color data is reduced after the NTSC conversion.

With respect to this, Japanese Patent Laid-Open No. 2017-38242 discloses a gray conversion method that corrects gray values generated by a general gray conversion process so as to equalize intervals between adjacent gray values according to the number of colors included in color data. According to this method, it is possible to avoid a gray value difference after conversion with a specific color scheme from being reduced and thereby discrimination from being reduced as in the NTSC conversion and the like.

However, in the method described in Japanese Patent Laid-Open No. 2017-38242, as a result of equalizing the gray value differences, gray value differences may be smaller than before equalization in some color schemes and discrimination may be reduced. In addition, if a color scheme changes and density order at the gray values generated by the gray conversion process changes, even in the same color, the gray values may significantly change due to the equalization of the gray value differences. Therefore, if the same color is used for the same element over a plurality of pages like colors of the background of a headline and a logo and the color scheme changes from page to page, the gray value of the same element may significantly change from page to page. Therefore, there becomes a problem in which it is difficult to grasp an element common between pages on the basis of color.

SUMMARY OF THE INVENTION

The present invention is an image processing apparatus that corrects gradation values of monochrome data converted from color data and that includes correction unit configured to, when there are three or more gradation values after conversion and there are a plurality of gradation value differences between adjacent gradation values arranged in order of magnitude, if there is a gradation value difference smaller than a prescribed threshold value among the plurality of gradation value differences, correct the gradation value difference smaller than the threshold value to increase in the range of the threshold value or smaller by reducing other gradation value differences adjacent to the gradation value difference smaller than the threshold value.

Further features of the present invention will become apparent from the following description of exemplary embodiments with reference to the attached drawings.

BRIEF DESCRIPTION OF THE DRAWINGS

FIG. 7A is an example of a color value list;

FIG. 7B is an example of a color value list;

FIG. 7C is an example of a color value list;

DESCRIPTION OF THE EMBODIMENTS

Figure 1:
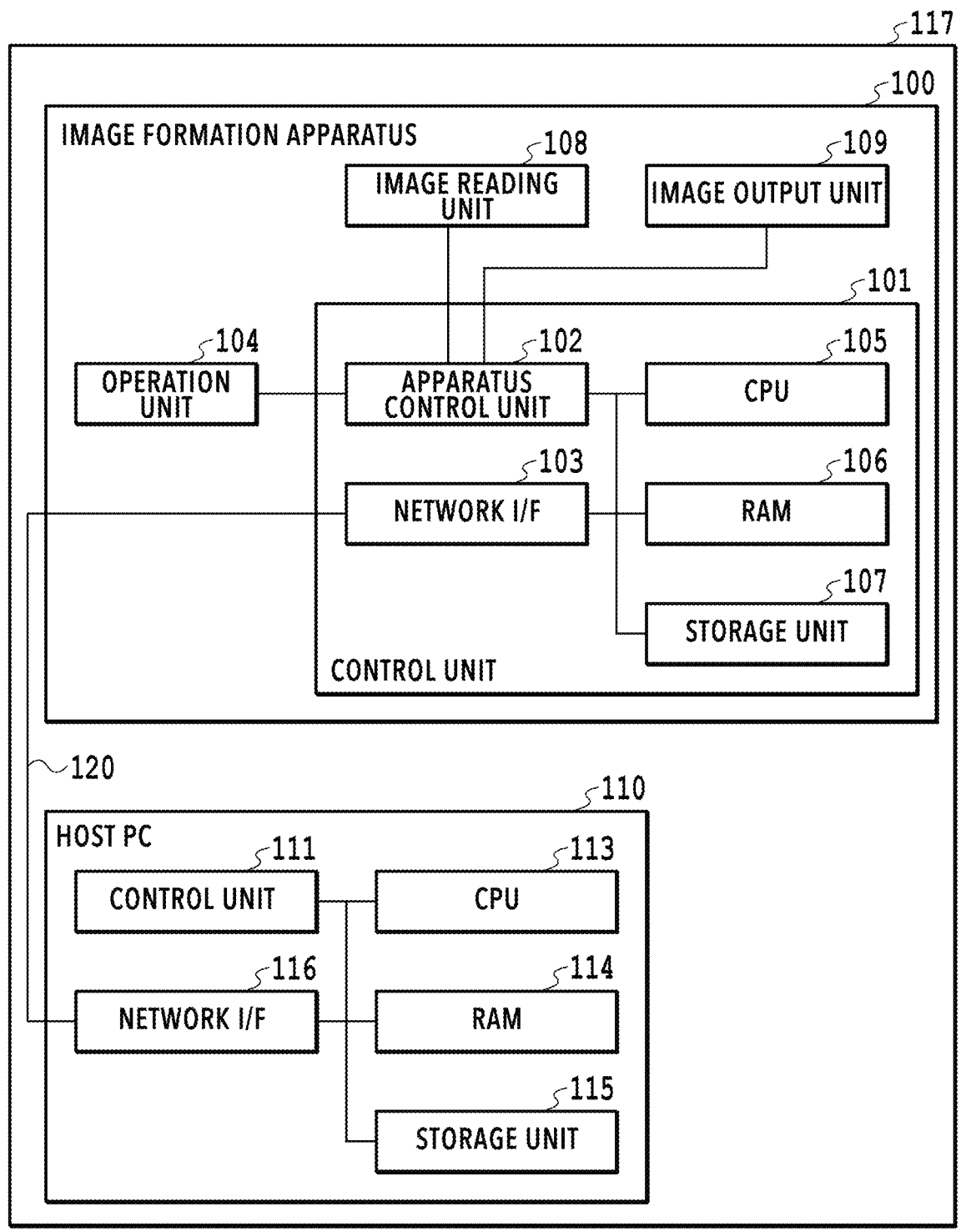
FIG. 1 is a block diagram showing a configuration of an image processing system according to the present invention.

Here, first, the problems of the related art will be described using a specific example. Here, grayscale data is considered that is obtained by performing color-monochrome conversion, such as NTSC conversion, in which RGB values are weighted and combined, for color data having the RGB values of four colors. As a first example, a case is considered where grayscale data having gray values of (0), (200), (203), and (255) is obtained. In the first example, two of the four colors have a small gray value difference between (200) and (203) and have poor discrimination.

When the gray value correction method described in Japanese Patent Laid-Open No. 2017-38242 is applied to this grayscale data, the gray values are allocated at equal intervals between 0-255 that can be taken, and the gray values are corrected to (0), (85), (170), and (255), respectively. That is, as a result of gray value correction processing, the gray value (0) has been corrected to (0), the gray value (200) to (85), the gray value (203) to (170), and the gray value (255) to (255). As a result, the gray values (200) and (203), which had poor discrimination, have been corrected to (85) and (175), respectively, the gray value difference is increased from 3 to 85, and discrimination is improved. However, since the gray values (0) and (200) have been corrected to (0) and (85), respectively, the gray value difference has been decreased from 200 to 85.

Next, as a second example, a case is considered where grayscale data having gray values of (0), (190), (200), and (255) is obtained by performing color-monochrome conversion. When correction is made also for the second example by the method in Japanese Patent Laid-Open No. 2017-38242, the gray values are corrected to (0), (85), (170), and (255), respectively, in the same way as the first example. That is, before and after correction, the gray value (0) has been corrected to (0), the gray value (190) to (85), the gray value (200) to (170), and the gray value (255) to (255).

In the first example, the gray value (200) has been corrected to (85), whereas in the second example, the same gray value (200) has been corrected to (170). That is, in the case where the color scheme of the color data changes, the gray value associated with the same color has changed from (85) to (170), which is larger by 85. This unit that in a situation in which the same color is used for the same element over a plurality of pages like a color in the background of a headline and a color of a logo, if the color scheme in a page changes from page to page, gray values of the background and logo may significantly change from page to page.

On the other hand, in the present invention, as described above, while suppressing a large change in distribution of a plurality of gray values of a monochrome image associated with colors of a color image, gradation values of the monochrome image are corrected so as to improve discrimination.

Hereinafter, embodiments for implementing the present invention will be described with reference to the drawings.

First Embodiment

<Image Formation Apparatus>

FIG. 1 is an example of an image processing system 117 according to the present invention, and the image processing system 117 includes an image formation apparatus 100 and a host PC 110.

The image formation apparatus 100 is an example of an image processing apparatus according to the present invention, and is, for example, an MFP (Multi-Function Peripheral) in which a plurality of functions such as a scan function and a printer function are integrated. A control unit 101 controls the image formation apparatus 100 overall, and includes a CPU 105, a RAM 106, a storage unit 107, an apparatus control unit 102, and a network interface (I/F) 103. The control unit 101 may further include, for example, a GPU or the like that performs various image processes for reading out image data stored in the storage unit 107 and optimizing the image data according to parameters.

The CPU 105 expands a program stored in the storage unit 107 in the RAM 106, executes it, and thereby controls operation of the image formation apparatus 100. The RAM 106 is a temporary storage memory and can temporarily store image data, a program, and the like. The storage unit 107 is, for example, a hard disk, and stores parameters for controlling the image formation apparatus 100 and an application, a program, an OS, and the like for realizing control according to the embodiment.

The apparatus control unit 102 is a device controller and controls units, such as an operation unit 104, an image reading unit 108, and an image output unit 109, connected to the control unit 101. In addition, image processing based on setting information notified from the operation unit 104 is also performed. Note that processing of converting a color image into a grayscale image is performed here. The network I/F 103 performs data communication with an external apparatus via a network 120.

The image reading unit 108 is, for example, a scanner, and the image output unit 109 is, for example, a printer. The CPU 105 executes the above-described program, which realizes a scan function to obtain image data on a manuscript read by the image reading unit 108 and an output function to output an image to a recording medium such as paper, a monitor, or the like via the image output unit 109. The operation unit 104 includes a touch panel, a hardware key, or the like, receives operation of instructions and setting from a user, and displays apparatus information on the image formation apparatus 100, progress information on a job, and various user interface screens. Setting information and the like received by the operation unit 104 are stored in the storage unit 107 via the apparatus control unit 102.

The host PC 110 includes a CPU 113, a RAM 114, a storage unit 115, a control unit 111 for controlling various input/output apparatuses and the like, and a network I/F 116. The host PC 110 is connected to the image formation apparatus 100 via the network 120, and can perform data communication using the network I/F 116. Note that the CPU 113 may contain therein the control unit 111 and an image processing unit 112. The CPU 113 uses the RAM 114 to control an application, a printer driver, and the like, which are not shown, installed in the host PC 110. In addition to the blocks shown in FIG. 1, blocks necessary when functions of the image formation apparatus 100 and host PC 110 are performed are included as appropriate. In addition, the host PC 110, in the same manner as the image formation apparatus 100, may further include a GPU or the like that performs various image processes.

<Print Process>

Figure 2:
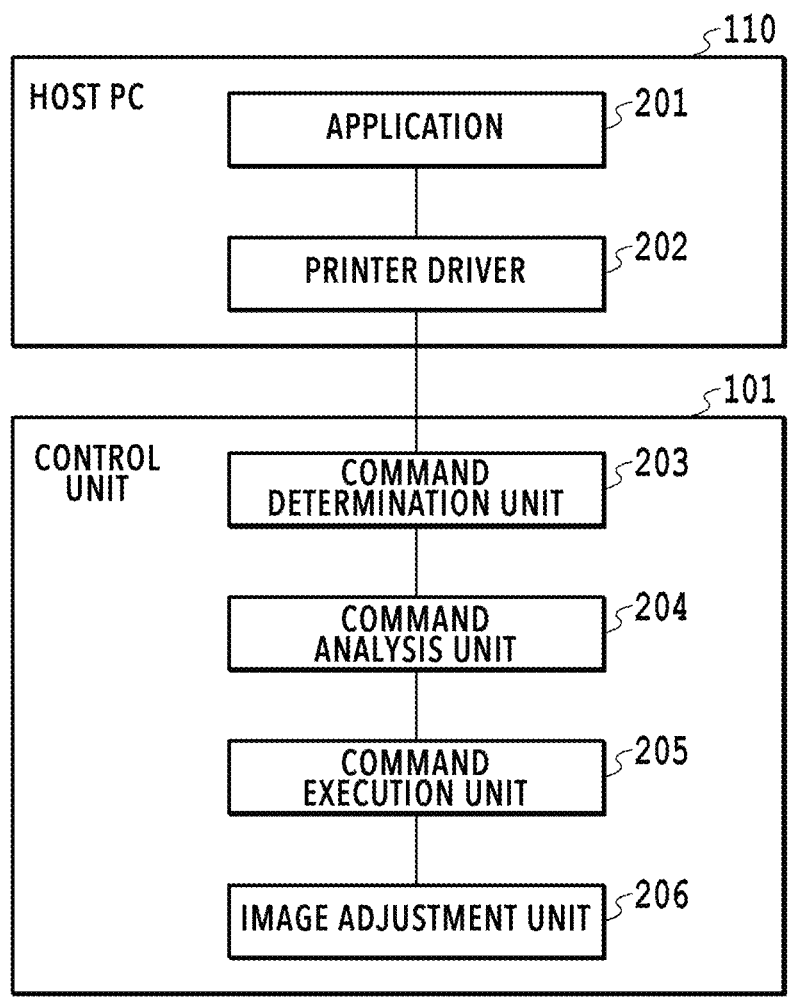
FIG. 2 is a block diagram showing a flow of a print process.

FIG. 2 is a diagram illustrating a flow of a print process in the image processing system 117 according to a first embodiment.

An application 201 and a printer driver 202 are installed in the host PC 110, and the host PC 110 uses the application 201 to create electronic data such as documents and presentation documents. The printer driver 202 is a driver for outputting print data to the image formation apparatus 100 and having it printed. The print data created by the printer driver 202 is sent to the image formation apparatus 100 and printed. Note that in the embodiment, since a gray conversion process is performed in the image formation apparatus 100, the print data created by the printer driver 202 is color data.

The print data is processed by the control unit 101 of the image formation apparatus 100. When receiving the print data, the image formation apparatus 100 causes a command determination unit 203 to determine a type of page description language (PDL). Types of PDL include Post Script (PS), Printer Command Language (PCL), and the like. A command analysis unit 204 includes analysis units for the respective types of PDL, and performs extraction and analysis of a command according to the type of PDL determined by the command determination unit 203. The gray conversion process and the like are performed according to contents of the command analyzed in this way.

A command execution unit 205 generates a raster image on the basis of an analysis result by the command analysis unit 204. An image adjustment unit 206 applies image processes such as color conversion and filtering to the raster image. Note that functions of the command determination unit 203, command analysis unit 204, command execution unit 205, and image adjustment unit 206 of the control unit 101 shown in FIG. 2 are realized by the CPU 105 executing the aforementioned program in the embodiment.

Figure 4A:
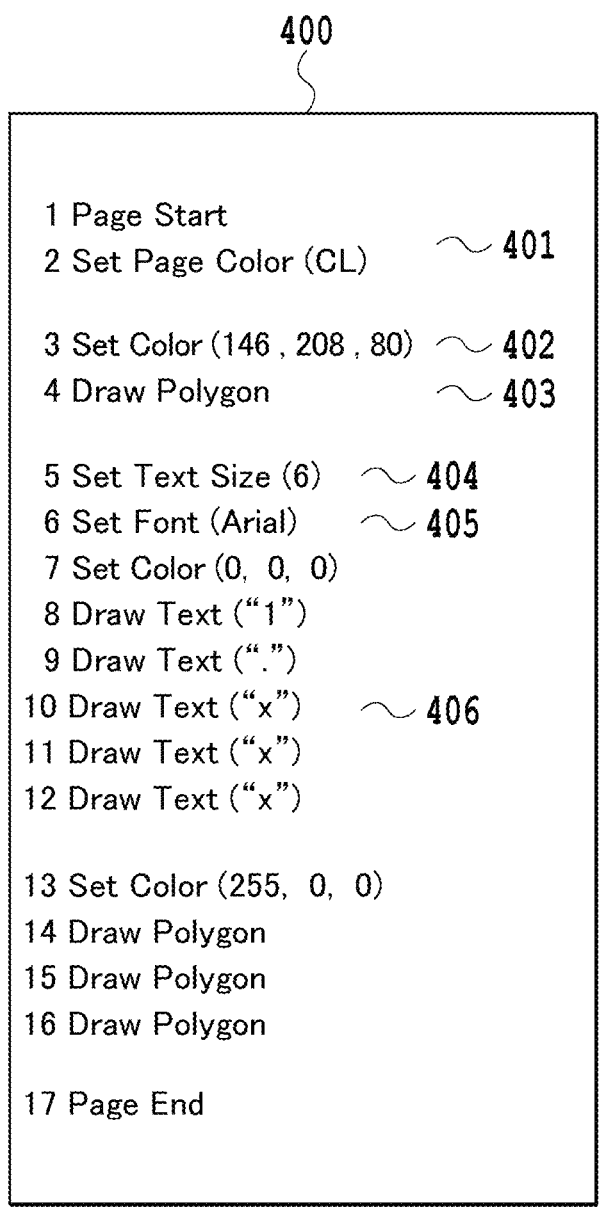
FIG. 4A is an example of a rendering command.
Figure 4B:
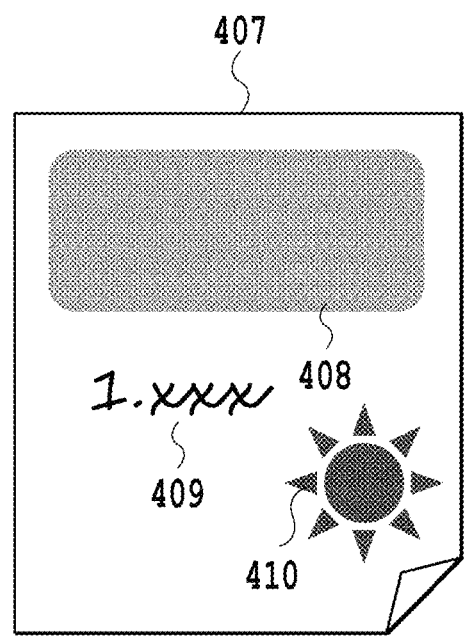
FIG. 4B is an example of the rendering command.

FIG. 4A is a diagram showing a command included in the print data received by the image formation apparatus 100 according to the first embodiment, and FIG. 4B is a diagram illustrating a conversion example thereof and an example of a rendering result based thereon. Commands include rendering commands and control commands, and a rendering command 400 indicates an example of the rendering commands. An image rendered using the rendering command 400 is indicated by an image 407.

The rendering command 400 includes a color mode setting command 401 for setting a color mode of a job and a color setting command 402 for setting a color. It further includes an object rendering command 403 for rendering an object, a character size setting command 404 for setting a character size, a font setting command 405 for setting a character font, and a character rendering command 406 for rendering a character. The structure of a series of these commands is the same also in cases of other objects and character strings. In addition to these, commands for setting coordinates and line thickness, a command for rendering an image, and the like are also included but omitted.

Here, contents of the rendering command 400 shown in FIG. 4A will be simply described. Note that the rendering command 400 and color value data hereinafter are on the presumption of an 8-bit color image.

"Set Page Color (CL)" 401 indicates that following commands are developed in color.

"Set Color (146, 208, 80)" 402 is a color setting command, and indicates a color whose RGB value is R=146, G=208, and B=80.

"Draw Polygon" 403 is an object rendering command, and indicates rendering a graphic on the basis of coordinate values, which are not shown.

"Set Text Size (6)" 404 is a character size setting command, and indicates that a character size is a 6 point.

"Set Font (Arial)" 405 is a font setting command, and indicates that a character font is Arial.

"Draw Text ("x")" 406 is a character rendering command, and indicates rendering a character "x." Therefore, the third and fourth commands in FIG. 4A indicate that a rounded rectangle 408 in FIG. 4B is rendered in the color specified by the third command. Similarly, fifth to twelfth commands indicate that a character string "1.xxx" 409 is rendered in black with an Arial font at a character size of 6 point. Furthermore, thirteenth to sixteenth commands indicate that a sun 410 is rendered in the color specified by the thirteenth command.

The above is an example of the print process, and in the first embodiment, description will be made on the basis of this flow of process.

<Gray Conversion Process>

A gray conversion process of the present invention will be described. Note that the description will be made here assuming that the image formation apparatus 100 performs the gray conversion process, but the host PC 110 may perform a similar gray conversion process. As described above, also here, each process will be described on the presumption of an 8-bit color image data.

In the gray conversion process of the present invention, first, colors used within one page are extracted as RGB values, the RGB values of the colors are weighted, and an individual gray value (gradation value) is calculated for each extracted color. Next, with respect to gray values corresponding to the extracted colors, a gray value difference (gradation value difference) between adjacent gray values arranged in order of magnitude is calculated. If the gray value difference is smaller than a threshold value that is set in advance so that discrimination can be made, the gray value is corrected so that discrimination is made when being output. Then, a color-gray conversion table (color-monochrome conversion table) that converts color data into grayscale data is generated, regarding the corrected gray value as a gray value for the RGB value.

Figure 3:
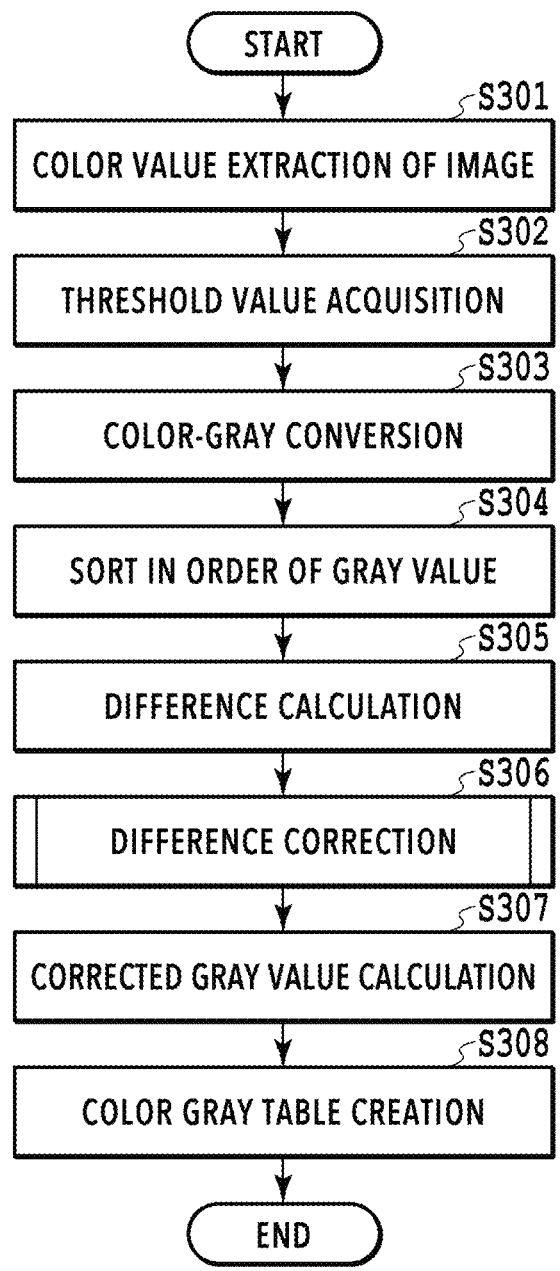
FIG. 3 is a flowchart showing a flow of a process of a first embodiment.

FIG. 3 is a flowchart of the gray conversion process of the present invention in the image formation apparatus 100. Here, FIG. 3 will be described with reference to FIGS. 4A, 4B, 5A, 5B, and 7A-7C.

The process shown in the flowchart is achieved by the CPU 105 expanding the program stored in the storage unit 107 into the RAM 106 and executing the expanded program. As described above, the description will be made assuming that the process is performed by the CPU 105 functioning as the command analysis unit 204. Furthermore, the output will be described assuming that the command analysis unit 204 receives a rendering command specified as monochrome, as in the rendering command 400 shown in FIG. 4A. It is assumed that even if the color mode setting command 401 specifies monochrome, the color setting command 402 is sent to the command analysis unit 204 while keeping the color value.

Figures 5A, 5B:
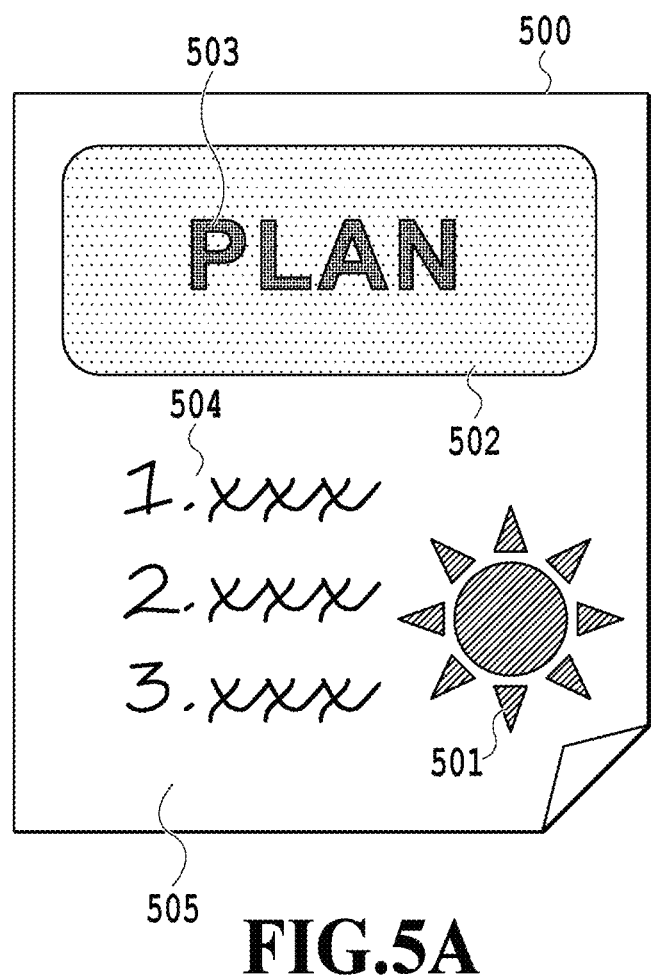
FIG. 5A is an example of a color image.
FIG. 5B is an example of a color image.

Here, the description will be made using an image 500 shown in FIG. 5A and a color value list 510 shown in FIG. 5B as examples. The image 500 shown in FIG. 5A is digital image data in which a sun 501, a rounded rectangle 502, characters 503 of "PLAN" disposed inside the rounded rectangle 502 are rendered in color, and other characters 504 are rendered in black. A first color value 506 of a color value list 510 shown in FIG. 5B is (255, 0, 0), a second color value 507 is (146, 208, 80), and a third color value 508 is (255, 192, 0). Although not written in the color value list 510, a color value of the other characters 504 is black (0, 0, 0) and a color value of a paper white portion 505 is white (255, 255, 255).

Hereinafter, the flowchart in FIG. 3 will be described.

In S301, the command analysis unit 204 checks the color setting command 402, and extracts a color value specified by the color setting command 402. Then, the extracted color value is added to a color value list 700 shown in FIG. 7A. The color value list 700 holds an index and an RGB value for the extracted color value. If a color value same as the extracted color value specified by the color setting command 402 is already stored in the color value list 700, it is not newly added to the color value list. After completion of the color value list 700 of the image 500 shown in FIG. 5A, the CPU 105 stores the color value list 700 in the RAM 106.

Next, in S302, the image adjustment unit 206 acquires a threshold value stored in the RAM 106. The threshold value is a reference value for determining discrimination between adjacent gray values after gray conversion. In the case where a gray value difference is smaller than the threshold value, it is determined that the discrimination between the gray values is low, and it is determined that the gray values are correction objects. For example, in a case where the threshold value is 32 among 0 to 255 which the gray values can take, a case is considered where gray values are G1 (100) and G2 (115) after grayscale conversion of two colors C1 and C2. In this case, a gray value difference between G1 and G2 is 15, which is smaller than the threshold value 32, therefore discrimination is low, and G1 and G2 are made correction objects.

Next, in S303, the image adjustment unit 206 reads out the color value list 700 stored in the RAM 106, calculates a gray value list 701 shown in FIG. 7B for each color value, and stores it in the RAM 106. The values of the gray values list 701 are brightness values represented by gray values obtained by, for example, the aforementioned NTSC conversion, and, for example, when a color of Index 2 is subjected to the NTSC conversion, the value is 0.299×146+0.587×208+0.114×80=175. Alternatively, they may be any other values serving as indexes of brightness such as L values when the RGB values are converted into a general color space such as Lab or Lch.

Next, in S304, the image adjustment unit 206 reads out the color value list 700 and gray value list 701 stored in the RAM 106 and sorts the values of the color value list 700 in order of brightness (or darkness) of the gray values. Then, the image adjustment unit 206 generates a color value list 700' and a gray value list 702 sorted by the gray values as shown in FIG. 7C.

Next, in S305, the image adjustment unit 206 reads out the gray value list 702 after sorting stored in the RAM 106 in order of brightness of the gray values, and calculates gray value differences after sorting. It generates a gray value difference list 703 including gray value difference indexes and gray value differences in order of calculation of the gray value differences.

Here, the gray value difference indicates, for example, a difference (66) between a gray value (255) of Index 1 and a gray value (189) of Index 3 in FIG. 7C, and the gray value difference is calculated in order of index sorted based on the magnitude of the gray values. That is, the gray value difference is a value difference between two gray values whose values are adjacent. Hereinafter, it is assumed that the gray value difference between the gray value (255) of Index 1 and the gray value (189) of Index 3 is Dif (1)=255−189=66. Similarly, it is assumed that the gray value difference between Index 3 and Index 2 is Dif (2)=14, the gray value difference between Index 2 and Index 5 is Dif (3)=99, and the gray value difference between Index 5 and Index 4 is Dif (4)=76. Here, the variable i of Dif (i) is a value of the gray value difference index of the gray value difference list 703.

Next, in S306, the image adjustment unit 206 reads out the gray value difference list 703 stored in the RAM 106, corrects the gray value difference for each color, and generates a corrected gray value difference list 705. Here, in the case where a gray value difference is smaller than the threshold value on the basis of the threshold value determined in S302, the gray value difference is corrected so as to be equal to or larger than the threshold value. Details of this correction process will be described later.

Next, in S307, the image adjustment unit 206 reads out the corrected gray value difference list 705 stored in the RAM 106 and generates a corrected gray value list 706 sorted in order of gray value. The image adjustment unit 206 generates the corrected gray value list 706 sorted in order of gray value, for example, from the largest or smallest gray value after sorting, in this example, the gray value (255) of the brightest Index 1, and the corrected gray value difference list 705.

In this example, for example, since the gray value difference between the brightest Index 1 and the next brightest Index 3 is (59) according to the corrected gray value difference list 705, 255−59=196, which is a corrected gray value of Index 3. Similarly, corrected gray values of Index 2, Index 5, and Index 4 are (164), (76), and (0), respectively, as shown in the corrected gray value 706 in FIG. 7C.

Lastly, in S308, the image adjustment unit 206 creates a corrected gray value list 707 sorted in order of index from the corrected gray value list 706 sorted in order of gray value stored in the RAM 106. In this way, a color gray table that defines a gray value corresponding to each color value is created.

Figure 6:
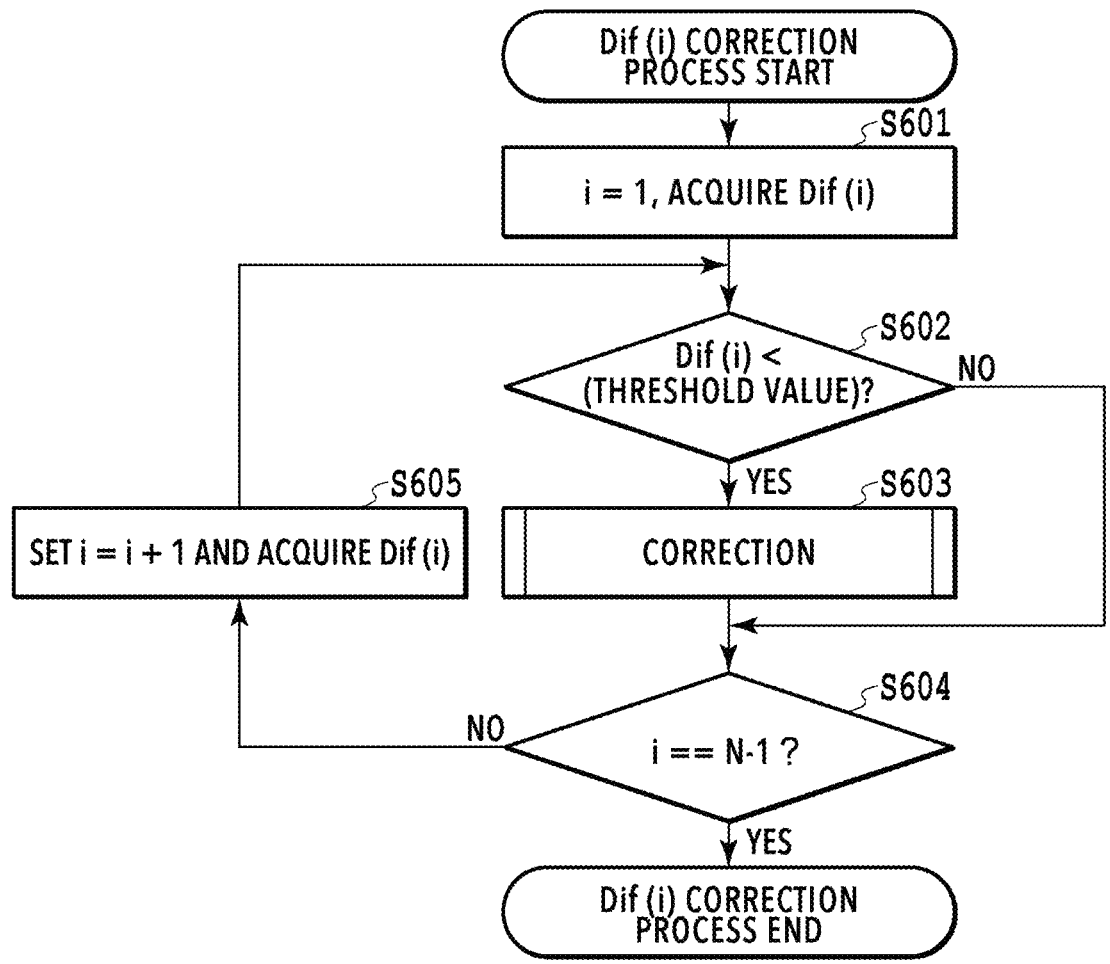
FIG. 6 is a flowchart showing details of a process performed in S306 of the first embodiment.

Next, details of a gray value difference correction method performed in the aforementioned S306 will be described. First, FIG. 6 shows a flowchart of a determination process of whether to perform correction. Here, the description will be made with reference to the list in FIG. 7C.

Here, the image adjustment unit 206 reads out the gray value difference list 703 stored in the RAM 106, and makes correction if a gray value difference is smaller than the prescribed threshold value.

First, in S601, the image adjustment unit 206 reads out the gray value difference list 703 from the RAM 106 and acquires the gray value difference Dif (i) of a gray value difference index i from the gray value difference list 703, where $1 \leq i \leq N-1$ and N denotes the number of colors. Here, in S601, i is set as i=1, and the corresponding Dif (1) is acquired.

Next, in S602, the image adjustment unit 206 reads out the threshold value determined in S302 from the RAM 106, and compares the threshold value with the gray value difference Dif (i) acquired in S601. Here, if the gray value difference Dif (i) is equal to or larger than the threshold value, the determination is NO and the process proceeds to S604, and if the gray value difference Dif (i) is smaller than the threshold value, the determination is YES and the process proceeds to S603.

If the gray value difference Dif (i) is smaller than the threshold value in S602, in S603, the image adjustment unit 206 makes correction to increase the gray value difference Dif (i), and proceeds to S604. The correction method will be described after this description.

On the other hand, if the gray value difference Dif (i) is equal to or larger than the threshold value in S602, in S604, the image adjustment unit 206 determines whether the comparison process with the threshold value has been performed for all the gray value differences Dif (1) to Dif (N−1). For example, in the embodiment, when the comparison process is performed on Dif (i) in order from i=1, it is determined whether i=N−1. That is, if i=N−1, it is determined that the correction of the gray value differences is all ended and the correction process in S306 is ended, whereas if i≠N−1, the process proceeds to S605.

Next, in S605, the image adjustment unit 206 newly defines a value obtained by adding 1 to i as i, and reads out the gray value difference Dif (i) of the newly defined i from the gray value difference list 703 stored in the RAM 106. For example, it reads out the gray value difference Dif (2)=(14) of the gray value difference index i=2 in FIG. 7C, acquires a next gray value difference, and proceeds to S602.

This concludes the description of the gray value difference correction process.

Next, the correction process in S603 in FIG. 6 will be described with reference to flowcharts in FIGS. 9 and 10.

In this correction process, if a gray value difference of interest is smaller than the threshold value, a process of reducing nearby gray value differences and increasing the gray value difference of interest by that amount is performed.

Here, regarding the gray value difference of interest and the nearby gray value differences, assuming that Dif (1) which is the gray value difference index 1 in the gray value difference list 703 shown in FIG. 7C is the gray value difference of interest, the nearby gray value differences indicate Dif (2) which is the gray value difference index 2. In addition, assuming that Dif (2) is the gray value difference of interest, the nearby gray value differences indicate Dif (1) and Dif (3). That is, the nearby gray value differences are gray value differences before and after the gray value difference of interest in the gray value differences sorted in order of gray value.

In the correction process, it is made sure that the nearby gray value differences may not fall below the threshold value as a result of increasing the gray value difference of interest. For that purpose, for the nearby gray value differences of the gray value difference of interest, it is also determined whether their values are equal to or larger than the threshold value. If the nearby gray value differences before correction are larger than the threshold value, the nearby gray value differences are reduced within a range where the nearby gray value differences do not fall below the threshold value, and the gray value difference of interest is increased by that reduced amount. By correcting the gray value difference in this way, it is possible to prevent a gray value difference at another place from becoming smaller than the threshold value after correction.

<Case of One Nearby Gray Value Difference>

A correction process when there is one nearby gray value difference will be described with reference to FIG. 9, whereas a correction process when there are two nearby gray value differences will be described with reference to FIG. 10.

First, a case where there is one nearby gray value difference will be described. Here, the case where there is one nearby gray value difference is when the gray value difference Dif (1) or Dif (4) corresponding to the first or last of the gray value difference indexes is the gray value difference of interest, taking FIG. 7C as an example. Here, the description will be made assuming that the gray value difference of interest is Dif (1).

In S901, the image adjustment unit 206 reads out the gray value difference list 703 and the threshold value determined in S302 from the RAM 106, acquires the nearby gray value difference Dif (2) of the gray value difference Dif (1), and determines whether the gray value difference Dif (2) is larger than the threshold value.

$$Dif(2) > (\text{threshold value}) \hspace{2cm} (1)$$

Here, if the gray value difference Dif (2) is larger than the threshold value, the determination is YES and the process proceeds to S902. On the other hand, if the gray value difference Dif (2) is equal to or smaller than the threshold value, the determination is NO and the process proceeds to S905.

If the gray value difference Dif (2) is equal to or larger than the threshold value, in S902, the image adjustment unit 206 reads out the gray value difference of interest Dif (1) and the nearby gray value difference Dif (2) from the gray value difference list 703 stored in the RAM 106, and determines whether the sum thereof is equal to or larger than twice the threshold value.

$$Dif(1) + Dif(2) \geq (\text{threshold value}) \times 2 \hspace{1cm} \text{Expression (2)}$$

The reason to perform this operation is that the sum of the gray value difference of interest and the nearby gray value difference needs to be equal to or larger than twice the threshold value in order to make each gray value difference equal to or larger than the threshold value after correction. Here, if the sum of the two gray value differences is equal to or larger than twice the threshold value, the determination is YES and the process proceeds to S903, whereas if the sum is smaller than twice the threshold value, the determination is NO and the process proceeds to S904.

In the case where the sum of the gray value difference Dif (1) and gray value difference Dif (2) is equal to or larger than twice the threshold value, in S903, the image adjustment unit 206 reads out the threshold value, gray value difference Dif (1), and gray value difference Dif (2) from the RAM 106, and performs the following operation. That is, first, it corrects the gray value difference of interest Dif (1) to the same value as the threshold value. Dif' (1) denotes a corrected gray value difference of interest.

$$Dif'(1) = (\text{threshold value}) \hspace{2cm} \text{Expression (3)}$$

Then, the nearby gray value difference Dif (2) is set to a value obtained by subtracting the corrected gray value difference of interest Dif' (1) from the sum of the two gray value differences like the following Expression (4). Dif' (2) denotes a corrected nearby gray value difference.

$$Dif'(2) = Dif(1) + Dif(2) - Dif'(1) \hspace{1cm} \text{Expression (4)}$$

In this way, the gray value difference of interest Dif (1) that is smaller than the threshold value is corrected to a gray value difference that achieves a prescribed minimum discrimination, while the nearby gray value difference Dif (2) decreases by the amount ((threshold value)−Dif (1)) of increase of the gray value difference of interest Dif (1). However, during the determination of S902, if the corrected gray value difference of interest Dif' (1) is equal to the threshold value, it is guaranteed that the corrected nearby gray value difference Dif' (2) is also equal to or larger than the threshold value. Therefore, the corrected two gray value differences are both values that can achieve the prescribed minimum discrimination.

On the other hand, in S902, if the sum of the gray value difference Dif (1) and gray value difference Dif (2) is smaller than twice the threshold value, in S904, the image adjustment unit 206 reads out the threshold value, gray value difference Dif (1), and gray value difference Dif (2) from the RAM 106, and performs operation of the following Expression (5). That is, it makes the nearby gray value difference Dif (2) the same value as the threshold value.

$$Dif'(2) = (\text{threshold value}) \hspace{2cm} \text{Expression (5)}$$

Then, the gray value difference of interest Dif (1) is made a value obtained by subtracting the corrected nearby gray value difference Dif' (2) from the sum of the two gray value differences like the following Expression (6).

$$Dif'(1) = Dif(1) + Dif(2) - Dif'(2) \hspace{1cm} \text{Expression (6)}$$

By doing so, it is not possible to achieve the prescribed minimum discrimination between all the gray values in S902, but the gray value difference of interest Dif (1) can be increased although not enough. That is, the gray value difference of interest Dif (1) can be increased by the amount (Dif (2)−(threshold value)) about which the nearby gray value difference Dif (2) which was equal to or larger than the threshold value has been reduced to the threshold value.

On the other hand, if the gray value difference Dif (2) is smaller than the threshold value in S901, nothing is done and the process ends in S905. Here, since both gray value difference of interest Dif (1) and nearby gray value difference Dif (2) are equal to or smaller than the threshold value, the discrimination is avoided from further deteriorating due to forcible correction.

As described above, the gray value difference of interest Dif (i) and its nearby gray value difference Dif (i+1) or Dif (i−1) are corrected.

This time, in order to determine whether correction of the gray value difference Dif (1) of the gray value difference index 1 can be made and the amount of correction, the gray value difference Dif (2) of the gray value difference index 2 is referred to. Similarly to this, when correcting the gray value difference Dif (N−1) of the gray value difference index (N−1), the gray value difference Dif (N−2) of the gray value difference index (N−2) may be referred to, and the correction method is the same so its detailed description is omitted.

<Case of Two Nearby Gray Value Differences>

Next, a method for correcting a gray value difference of interest Dif (i) having two nearby gray value differences will be described with reference to FIG. 10, where 1<i<N−1.

In S1001, the image adjustment unit 206 reads out the threshold value and a first nearby gray value difference Dif (i−1) of the gray value difference of interest Dif (i) from the RAM 106, and determines which is larger.

$$Dif(i-1) > (\text{threshold value}) \quad \text{Expression (7)}$$

Here, if the first nearby gray value difference Dif (i−1) is larger than the threshold value, the determination is YES and the process proceeds to S1002, whereas if it is equal to or smaller than the threshold value, the determination is NO and the process proceeds to S1003.

If the first nearby gray value difference Dif (i−1) is larger than the threshold value in S1001, in S1002, the image adjustment unit 206 reads out the threshold value, gray value difference of interest Dif (i), and nearby gray value differences Dif (i−1) and Dif (i+1) from the RAM 106. Then, it determines whether the sum of the three gray value differences is equal to or larger than three times the threshold value.

$$Dif(i-1) + Dif(i) + Dif(i+1) \, (\text{threshold value}) \times 3 \quad \text{Expression (8)}$$

The reason to perform this operation is that the sum of the gray value difference of interest and the two nearby gray value differences needs to be three times the threshold value or larger in order to make each gray value difference equal to or larger than the threshold value after correction. Here, if the sum of the three gray value differences is equal to or larger than three times the threshold value, the determination is YES and the process proceeds to S1004, whereas if the sum is smaller than three times the threshold value, the determination is NO and the process proceeds to S1005.

Figure 9:
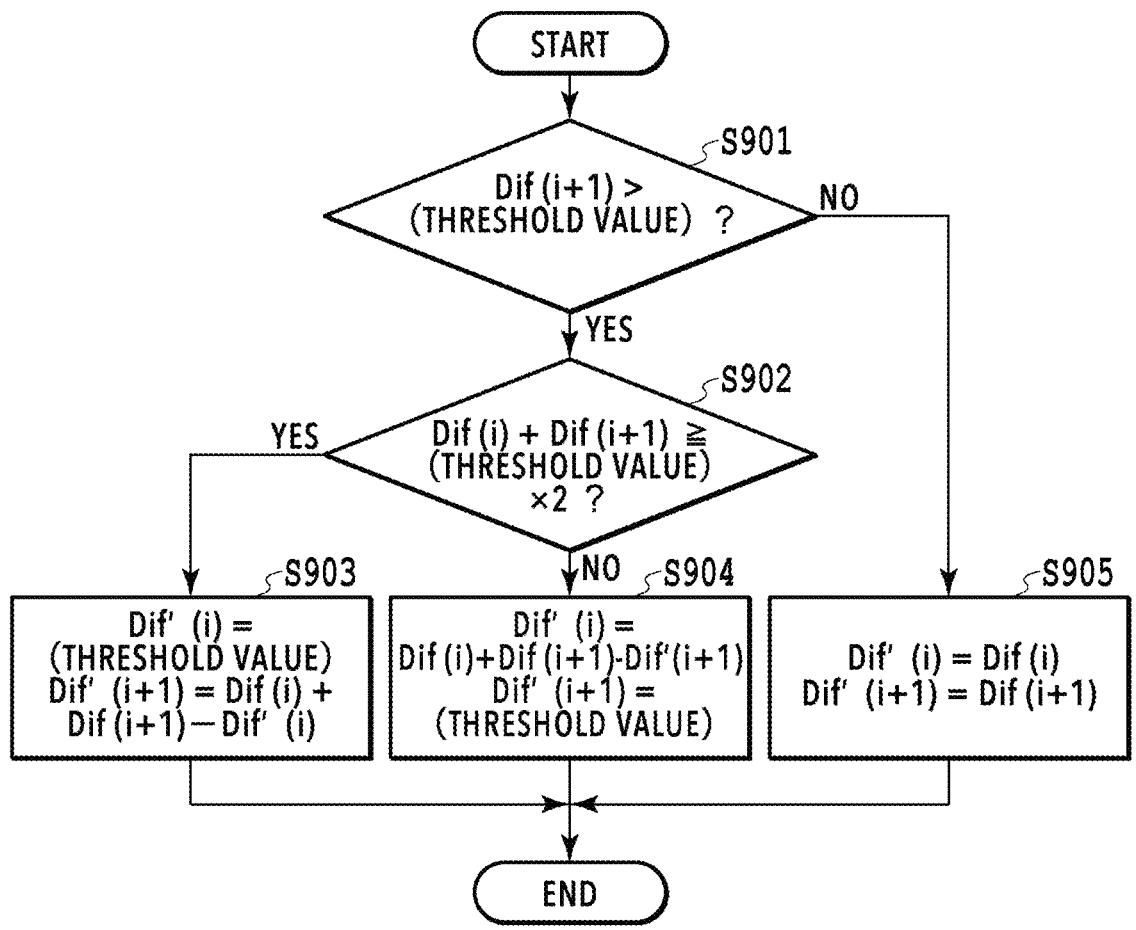
FIG. 9 is a flowchart showing details of a process performed in S603 of the first embodiment.

On the other hand, if the first nearby gray value difference Dif (i−1) is smaller than the threshold value in S1001, in S1003, the image adjustment unit 206 sets Dif (i+1) as a second nearby gray value difference, and performs processes similar to S901 to S905 in FIG. 9. This is because it is not possible to further reduce the first nearby gray value difference Dif (i−1) smaller than the threshold value. Therefore, a correction process is performed for the gray value difference of interest Dif (i) in the same way as in the case where there is one nearby gray value difference for the gray value difference of interest Dif (i) as described in the flowchart in FIG. 9.

If the sum of the three gray value differences is equal to or larger than three times the threshold value in S1002, in S1004, the image adjustment unit 206 performs the following operation for the gray value difference of interest Dif (i) and first and second nearby gray value differences Dif (i−1) and Dif (i+1). That is, first, the gray value difference of interest Dif (i) is set to the threshold value which is the minimum value necessary to achieve the predetermined discrimination.

$$Dif'(i) = (\text{threshold value}) \quad \text{Expression (9)}$$

Then, an amount of increase in the corrected gray value difference of interest Dif' (i), $$Dif'(i) - Dif(i) = (\text{threshold value}) - Dif(i) \quad \text{Expression (10)},$$

is obtained from the first nearby gray value difference Dif (i−1) and second nearby gray value difference Dif (i+1) which are equal to or larger than the threshold value.

First, since it is necessary that the first nearby gray value difference Dif (i−1) and second nearby gray value difference Dif (i+1) keep to the threshold value or larger, an amount to be allocated to the corrected gray value difference of interest Dif' (i) is part or all of a difference between each of them and the threshold value. An allocation ratio is determined by weighting according to magnitudes Y1 and Y2 of the respective differences from the threshold value. That is, the following operation is performed.

$$Y = Y1 + Y2 \quad \text{Expression (11)},$$

where, Y1=Dif (i−1)−(threshold value) and Y2=Dif (i+1)−(threshold value)

$$Dif'(i-1) = Dif(i-1) - ((\text{threshold value}) - Dif(i)) \times Y1/Y \quad \text{Expression (12)}$$

$$Dif'(i+1) = Dif(i+1) - ((\text{threshold value}) - Dif(i)) \times Y2/Y \quad \text{Expression (13)}$$

A specific example will be described later.

On the other hand, If the sum of the three gray value differences is smaller than three times the threshold value in S1002, in S1005, the image adjustment unit 206 reads out the threshold value and second nearby gray value difference Dif (i+1) from the RAM 106 and determines which is larger.

$$Dif(i+1) > (\text{threshold value}) \quad \text{Expression (14)}$$

Here, if the second nearby gray value difference Dif (i+1) is larger than the threshold value, the determination is YES and the process proceeds to S1006, whereas if it is equal to or smaller than the threshold value, the determination is NO and the process proceeds to S1007.

If the second nearby gray value difference Dif (i+1) is larger than the threshold value in S1005, the following operation is performed for the gray value difference of interest Dif (i), first nearby gray value difference Dif (i−1), and second nearby gray value difference Dif (i+1).

That is, the first and second nearby gray value differences Dif (i−1) and Dif (i+1) which were larger than the threshold value are both reduced to the threshold value.

$$Dif'(i-1) = Dif'(i+1) = (\text{threshold value}) \quad \text{Expression (15)}$$

Then, differences of the first and second nearby gray value differences between before and after correction are added to the gray value difference of interest Dif (i).

$$Dif'(i) = Dif(i) + Dif(i-1) + Dif(i+1) - (\text{threshold value}) \times 2 \quad \text{Expression (16)}$$

If the second nearby gray value difference Dif (i+1) is equal to or smaller than the threshold value in S1005, the following operation is performed for the gray value difference of interest Dif (i), first nearby gray value difference Dif (i−1), and second nearby gray value difference Dif (i+1). That is, the first nearby gray value difference Dif (i−1) which was larger than the threshold value is reduced to the threshold value.

$$Dif'(i-1) = (\text{threshold value}) \quad \text{Expression (15)}.$$

Then, a difference of the first nearby gray value difference between before and after correction is added to the gray value difference of interest Dif (i).

$$Dif'(i)=Dif(i)+Dif(i-1)-(\text{threshold value}) \quad \text{Expression (17)}$$

Then, the second nearby gray value difference Dif (i+1) is not corrected since it is equal to or smaller than the threshold value on the basis of S1002.

$$Dif'(i+1)=Dif(i+1) \quad \text{Expression (18)}$$

As described above, the correction of the gray value difference of interest Dif (i) and its nearby gray value differences Dif (i−1) and Dif (i+1) is made.

Figure 8:
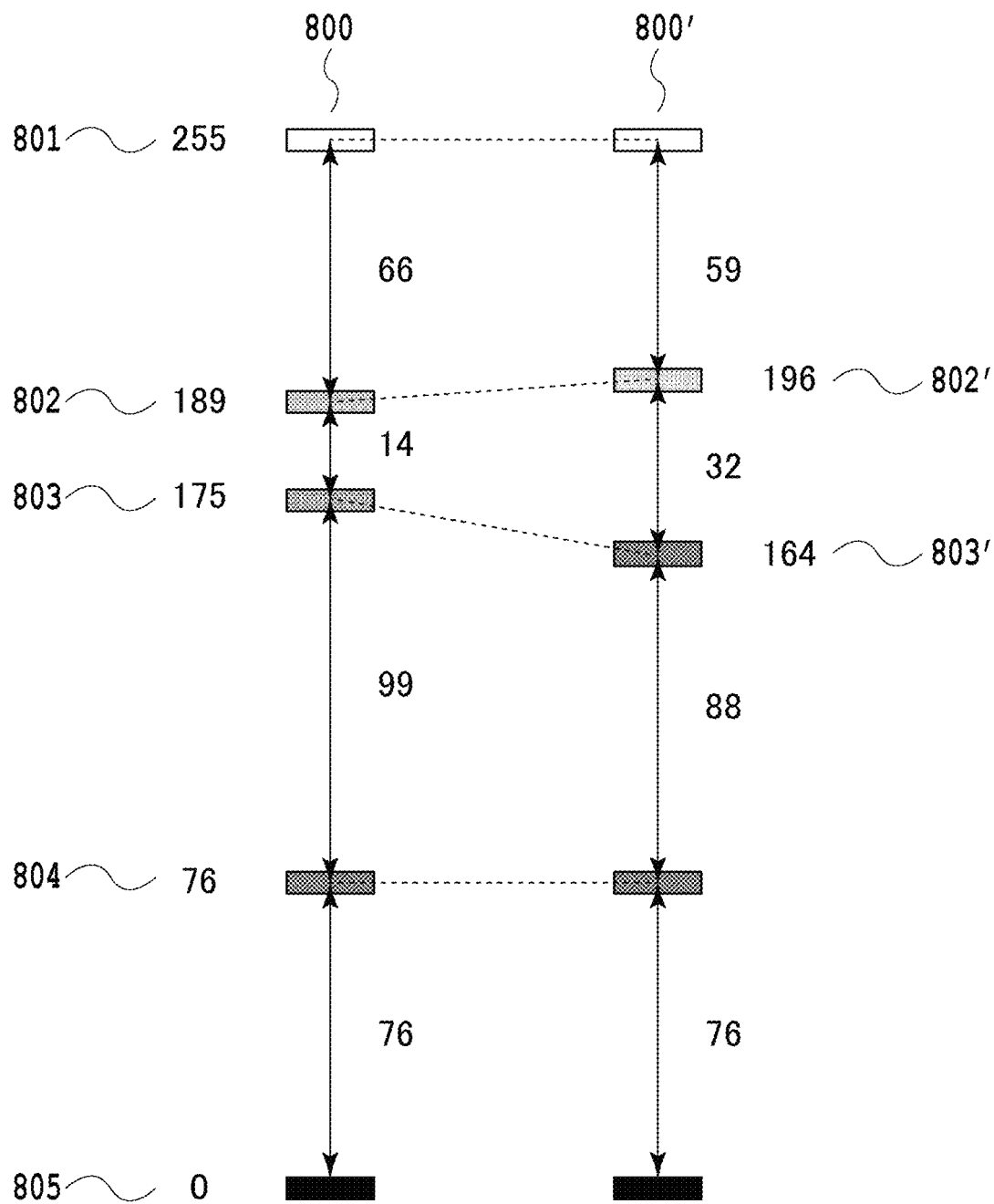
FIG. 8 is a schematic diagram showing signal values before and after the process of the first embodiment.

Here, a specific example of S1001 to S1007 will be described with reference to a schematic diagram in FIG. 8. In FIG. 8, 800 is a schematic diagram of the gray value 702 and gray value difference of the gray value difference list 703 after sorting in FIG. 7C, and 800' in FIG. 8 is a schematic diagram of the corrected gray value 706 and gray value difference 705 in FIG. 7C.

In this example, the gray value difference Dif (2)=14 between the gray value (189) 802 and gray value (175) 803 is largely corrected to Dif (2)=32 by the correction process. That is, the gray value difference Dif (2)=14 smaller than the threshold value is the gray value difference of interest, and gray value differences on both sides thereof, that is, the gray value difference Dif (1)=66 and gray value difference Dif (3)=99, are the nearby gray value differences.

In S1001, since the threshold value is 32, $$Dif(1)=66>32=(\text{threshold value}),$$

the determination is YES, and the process proceeds to S1002. Then, in S1002, since $$Dif(1)+Dif(2)+Dif(3)=179 \geq 32 \times 3=96,$$

the determination is YES and the process proceeds to S1004. In S1004, the gray value difference of interest Dif (2) is corrected as follows.

$$Dif'(2)=32=(\text{threshold value})$$

Here, in order to satisfy the following situation $$Dif(1)+Dif(2)+Dif(3)=Dif'(1)+Dif'(2)+Dif'(3),$$

the amount of increase in the corrected Dif' (2) needs to be absorbed by the Dif' (1) and Dif' (3). However, since each gray value difference needs to be the threshold value or larger, an upper limit value that can be allocated to the amount of increase in the corrected Dif' (2) from Dif (1) and Dif (3) is the sum of values obtained by subtracting the threshold value from each of Dif (1) and Dif (3). That is, $$Dif(1)-(\text{threshold value})=66-32=34; \text{ and}$$

$$Dif(3)-(\text{threshold value})=99-32=67,$$

and the sum of the two differences (=34+67=101) is a value to be used to absorb the increased amount in Dif (2).

In this example, since the gray value difference of interest Dif (2)=14 increases to Dif' (2)=32 and the increased amount is 18, this will be covered by the nearby gray value differences Dif (1) and Dif (3). Calculation of which of the nearby gray value differences Dif (1) and Dif (3) covers how much is made by the following expressions of weighting operation.

$$Dif'(1)=Dif(1)-18 \times 34/101=66-7=59; \text{ and}$$

$$Dif'(3)=Dif(3)-18 \times 67/101=99-11=88.$$

That is, Dif (1) covers 7 and Dif (3) covers 11.

As described above, when the gray value difference of interest is smaller than the predetermined threshold value, the gray value difference of interest is corrected to be the threshold value by adding an amount by which the nearby gray value differences are larger than the predetermined threshold value.

As a result of correction, the gray value difference of interest is increased to the threshold value and discrimination is improved, but it does not become larger than the threshold value and deterioration in discrimination of other colors is prevented. In addition, since the nearby gray value differences do not fall below the threshold value, the prescribed discrimination is secured. Furthermore, the gray value difference of interest and nearby gray value differences are corrected but other gray value differences are not corrected.

In conventional methods, since a targeted gray value is determined by the number of colors used within a page and density order of gray value, the gray value is largely changed when a color scheme is changed. However, as described above, in the invention, a value after correction of a gray value difference smaller than the threshold value is at most the threshold value, and gray value differences to be corrected are limited to a gray value difference smaller than the threshold value and nearby gray value differences adjacent thereof. Consequently, changes of gray values can be reduced to minimum changes necessary to achieve the prescribed discrimination.

In the embodiment, first, RGB values of colors used within one page are extracted. However, by extracting RGB values of colors used in all pages in one job, and creating grayscale data from color data common to all the pages, it is possible to allocate the same gray values to the same colors between pages.

In the embodiment, the sum of the gray value difference of interest and nearby gray value differences is compared with twice the threshold value in Expression (2) and three times the threshold value in Expression (8), but only the examples in which intervals equal to or larger than the threshold value are surely maintained are shown here, and the values on the right sides of Expressions (2) and (8) may be other values.

Second Embodiment

In the first embodiment, the predetermined prescribed threshold value is acquired in S302 in FIG. 3. However, when the number of colors used in a document is large, gray values obtained by converting color data into grayscale data are concentrated in a specific numerical range, the number of gray value differences smaller than the threshold value increases, and there is an increased possibility that nearby gray value differences of a gray value difference of interest may be also smaller than the threshold value. If the nearby gray values are also smaller than the threshold value, in S901 in FIG. 9, the determination becomes NO, the process in S905 is performed, and the correction process is not performed.

Figure 11:
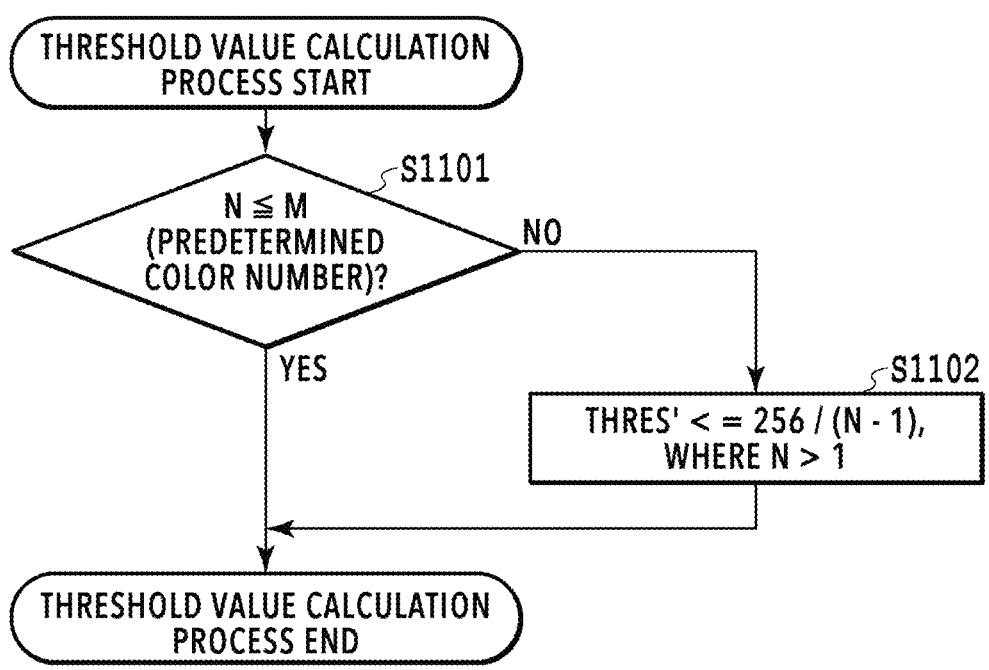
FIG. 11 is a flowchart showing a flow of a process of a second embodiment.

In this embodiment, the threshold value is changed according to the number of colors, and thereby a threshold value suitable for the number of colors is calculated so as to reduce a situation where correction cannot be made while improving discrimination after correction as much as possible. Hereinafter, a process of a second embodiment will be described with reference to a flowchart shown in FIG. 11. Note that the process shown in this flowchart is also achieved by the CPU 105 expanding a program stored in a storage unit 107 into a RAM 106 and executing the expanded program. Since a configuration and the like are the same as those of the first embodiment, only different points will be described.

First, in S1101, the image adjustment unit 206 acquires the number of colors from a gray value difference list 703 in a RAM 106. Here, the maximum value N of indexes is acquired and it is determined whether the maximum value N is smaller than a predetermined color number M. If it is smaller, the determination is YES and a predetermined threshold value is used. On the other hand, if N is larger than M, the determination is NO and the process proceeds to S1102.

For example, assuming that the threshold value for discrimination is set to 32 at 256 gradations of 8 bits and a state where 256 gradations are allocated at equal intervals by 32 is an ideal discrimination state, gray values that can be taken are 0, 32, 64, . . . , 255, and the number of colors to be used is 9 colors. However, if it is larger than 10 colors, they cannot be allocated at equal intervals.

Therefore, next in S1102, the image adjustment unit 206 calculates a threshold value' suitable for the number of colors.

(Threshold value')=256/(N−1),
where, N>1.

In the embodiment, the suitable threshold value' is calculated according to the number of colors in this way.

Third Embodiment

In the first and second embodiments, the threshold value of gray value difference necessary to achieve the predetermined minimum discrimination is defined and gray values are corrected.

Figure 12:
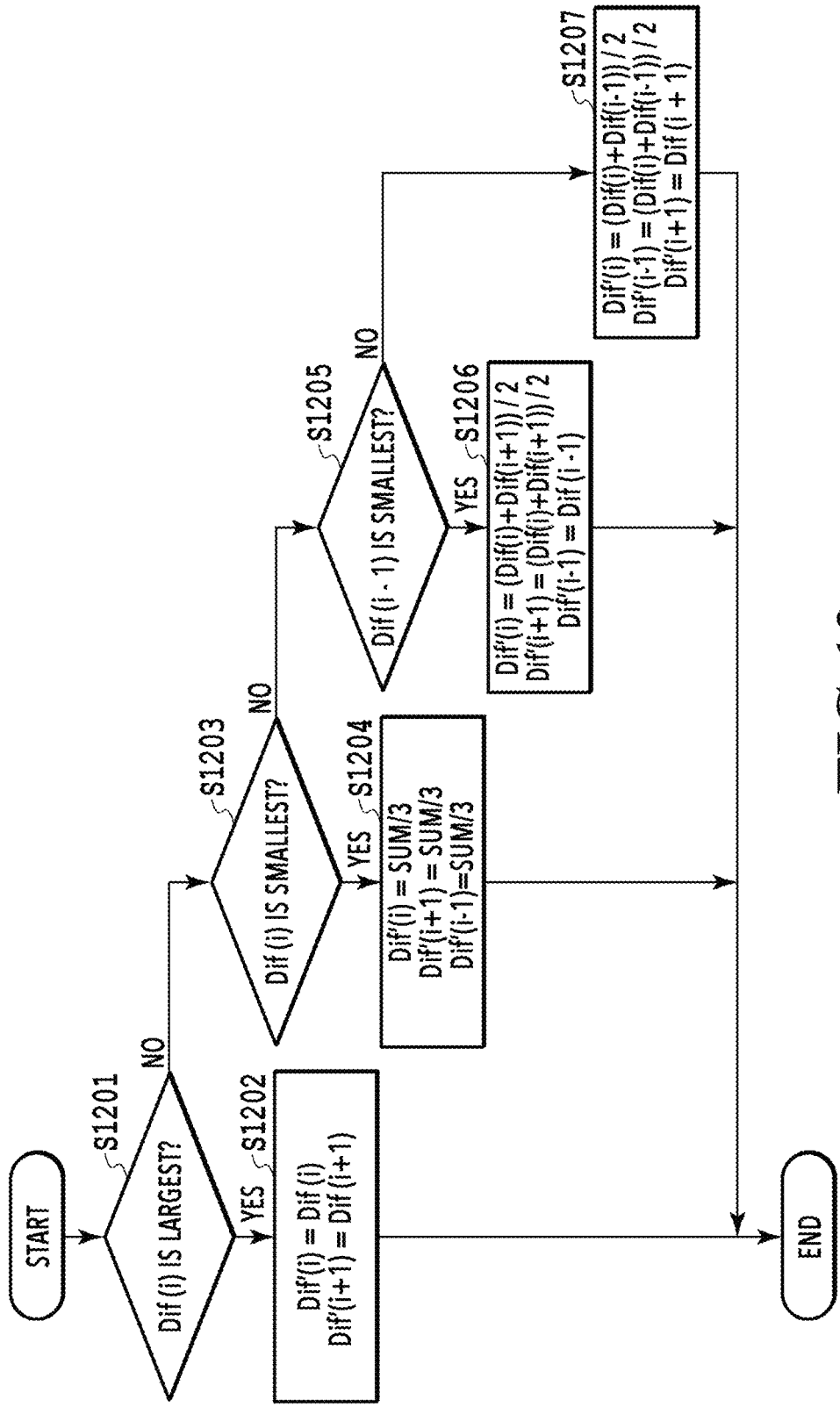
FIG. 12 is a flowchart showing a flow of a process of a third embodiment.

However, the gray value difference necessary to achieve the minimum discrimination can vary depending on whether objects are away from each other in the same page or they are adjacent to each other. In the case of adjacent objects, discrimination improves even if there is a slight gray value difference. Therefore, in this embodiment, different from S905 in FIG. 9 in the first embodiment in which the correction of gray value difference is not made at all, correction is made to increase the gray value difference even if it is slight. Hereinafter, a process of a third embodiment will be described with reference to a flowchart shown in FIG. 12. Note that the process shown in the flowchart is also achieved by a CPU 105 expanding a program stored in a storage unit 107 into a RAM 106 and executing the expanded program. Since a configuration and the like are the same as those of the first embodiment, only different points will be described.

Figure 10:
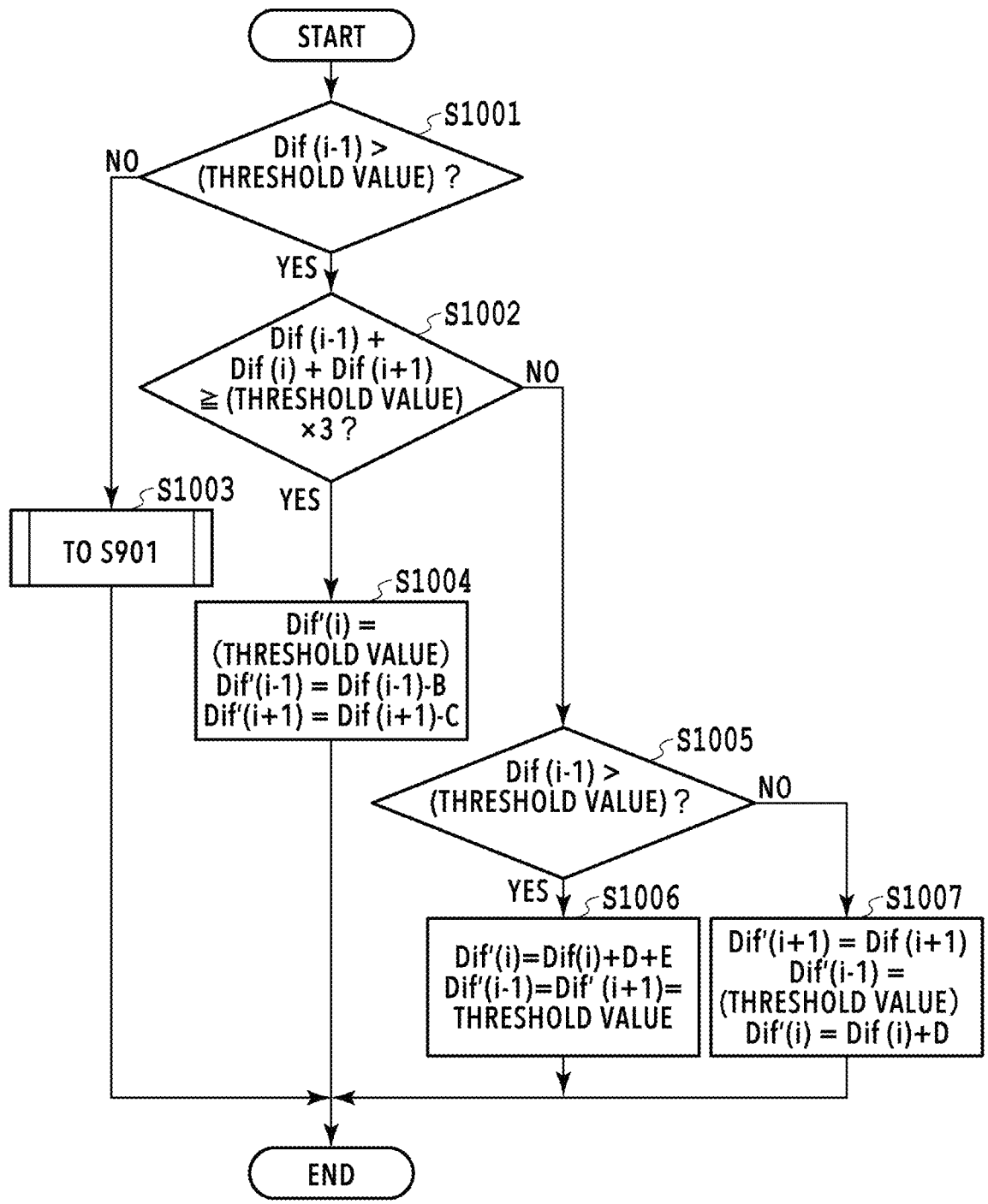
FIG. 10 is a flowchart showing details of a process performed in S603 of the first embodiment.

If all of three gray value differences Dif (i−1), Dif (i), and Dif (i+1) are smaller than the threshold value, the process transits from S1003 in FIGS. 10 to S901 and S905 in FIG. 9, and the gray value difference of interest Dif (i) is not corrected in the first embodiment. On the contrary to that, in this embodiment, even if all of the three gray value differences Dif (i−1), Dif (i), and Dif (i+1) are smaller than the threshold value, correction is made to increase the gray value difference Dif (i) even if it is slight.

First, in S1201, an image adjustment unit 206 determines whether the gray value difference of interest Dif (i) is larger than the nearby gray value differences Dif (i−1) and Dif (i+1). If the gray value difference of interest Dif (i) is the largest, the process proceeds to S1202, whereas if it is not the largest, the process proceeds to S1203.

If the gray value difference of interest Dif (i) is the largest in S1201, in S1202, the image adjustment unit 206 does not correct the gray value difference. This is because the gray value difference of interest Dif (i) is already larger than the nearby gray value differences Dif (i−1) and Dif (i+1), and the gray value differences of interest Dif (i) has higher necessity of correcting and increasing.

On the other hand, if the gray value difference of interest Dif (i) is not the largest in S1201, in S1203, the image adjustment unit 206 determines whether the gray value difference of interest Dif (i) is smaller than the nearby gray value differences Dif (i−1) and Dif (i+1). If the gray value difference of interest (i) is the smallest, the process proceeds to S1204, whereas if it is not the smallest, the process proceeds to S1205.

If the gray value difference of interest (i) is the smallest in S1203, in S1204, the image adjustment unit 206 performs the following operation to set the three gray value differences to an average value thereof.

$$Dif(i) = (Dif(i-1) + Dif(i) + Dif(i+1))/3 \quad \text{Expression (19)}$$

$$Dif(i-1) = (Dif(i-1) + Dif(i) + Dif(i+1))/3 \quad \text{Expression (20)}$$

$$Dif(i+1) = (Dif(i-1) + Dif(i) + Dif(i+1))/3 \quad \text{Expression (21)}$$

In this way, the smallest gray value difference of interest Dif (i) can be made larger although it is slight.

On the other hand, if the gray value difference of interest Dif (i) is not the smallest in S1203, in S1205, the image adjustment unit 206 determines whether the first nearby gray value difference Dif (i−1) is smaller than the gray value difference of interest Dif (i) and second nearby gray value difference Dif (i+1). If Dif (i−1) is the smallest, the process proceeds to S1206, whereas if it is not the smallest, the process proceeds to S1207.

If the first nearby gray value difference Dif (i−1) is the smallest in S1205, in S1206, the image adjustment unit 206 performs the following operation. That is, excluding the smallest first nearby gray value difference Dif (i−1), the gray value difference of interest Dif (i) and second nearby gray value difference Dif (i+1) are set to an average of the two gray value differences thereof.

$$Dif(i) = (Dif(i) + Dif(i+1))/2 \quad \text{Expression (22)}$$

$$Dif(i+1) = (Dif(i) + Dif(i+1))/2 \quad \text{Expression (23)}$$

$$Dif(i-1) = Dif(i-1) \quad \text{Expression (24)}$$

In this way, not taking into account the smallest first nearby gray value difference Dif (i−1), the gray value difference of interest Dif (i) is set to an average of the second nearby gray value difference Dif (i+1) and itself, and thereby the value of the gray value difference of interest Dif (i) is prevented from becoming small.

If the first nearby gray value difference Dif (i−1) is not the smallest in S1205, in S1207, the image adjustment unit 206 performs the following operation because the second nearby gray value difference Dif (i+1) is the smallest. That is, excluding the smallest second nearby gray value difference Dif (i+1), the gray value difference of interest Dif (i) and first nearby gray value difference Dif (i−1) is set to an average of the two gray value differences thereof.

$$Dif(i) = (Dif(i) + Dif(i-1))/2 \quad \text{Expression (25)}$$

$$Dif(i-1) = (Dif(i) + Dif(i-1))/2 \quad \text{Expression (26)}$$

$$Dif(i+1) = Dif(i+1) \quad \text{Expression (27)}$$

In this way, not taking into account the smallest nearby gray value difference Dif (i+1) for the gray value difference of interest Dif (i), the value of Dif (i) is prevented from becoming small.

As described above, the gray value difference of interest Dif (i) can be increased by correcting the gray value differences Dif (i−1), Dif (i), and Dif (i+1) by averaging excluding the smallest value.

As aforementioned, in the case where objects are adjacent to each other, it is possible to improve discrimination by increasing the value even slightly.

A grayscale image to which the correction process of the present invention is applied is desirably an image in which the number of colors in graphics, texts (characters), lines, and the like is small and color differences between the included colors are equal to or larger than the prescribed value. On the other hand, in an image such as a photo, since partially correcting gray values corresponds to changing color schemes in a color image, and since many colors with small color differences are included, it is desirable not to perform the correction process of the present invention. Therefore, regarding an image to which the correction process of the present invention is to be applied, an attribute of each object in the image is determined by an image area determination process, and on the basis of the determined attribute information, the correction process may be applied only to objects with a prescribed attribute.

In the first embodiment to the third embodiment, the description has been made using grayscale data as the correction object, but it goes without saying that similar effects can be obtained by performing the correction process on monochrome data represented by one gradation value.

According to the present invention, the gradation value difference of interest is increased by reducing the nearby gradation value differences adjacent to the gradation value difference of interest. Therefore, monochrome data to which the correction process of the present invention can be applied is data that has three or more gradation values and a plurality of gradation value differences between gradation values.

Other Embodiments

Embodiment(s) of the present invention can also be realized by a computer of a system or apparatus that reads out and executes computer executable instructions (e.g., one or more programs) recorded on a storing medium (which may also be referred to more fully as a 'non-transitory computer-readable storing medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storing medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storing medium. The storing medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present invention, it is possible to correct gradation values of monochrome data so as to improve discrimination while preventing a substantial change in the distribution of a plurality of gradation values of the monochrome data converted from color data.

This application claims the benefit of Japanese Patent Application No. 2019-073266 filed Apr. 8, 2019, which is hereby incorporated by reference wherein in its entirety.

What is claimed is:

1. An image processing apparatus comprising:
a controller including a processor and a memory, wherein the controller is configured to:
convert color data included in an image into grayscale data;
sort a plurality of gradation values of the grayscale data after the conversion, wherein the plurality of gradation values are sorted in order of magnitude;
responsive to a determination that a first gradation value difference among the plurality of gradation value differences between adjacent gradation values in the sorted plurality of gradation values is smaller than a threshold value, correct at least one gradation value so that the first gradation value difference is not less than the threshold value; and
correct at least one gradation value different from the corrected gradation value so that at least one second gradation value difference different from the first gradation value difference among the plurality of gradation value differences is reduced;
wherein a sum of the correction amounts for the at least one second gradation value difference is equal to the correction amount for the first gradation value difference, and each of the at least one second gradation value difference is greater than or equal to the threshold value.

2. The image processing apparatus according to claim 1, wherein the controller is further configured to calculate corrected gradation values based on a maximum value or a minimum value of the plurality of gradation values, the first gradation value difference and the at least one second gradation value difference.

3. The image processing apparatus according to claim 1, wherein each color of the color data has a color difference of a prescribed value or larger from each other.

4. The image processing apparatus according to claim 1, wherein the controller changes a correction amount of a gradation value difference smaller than the threshold value according to magnitude of the other gradation value differences.

5. The image processing apparatus according to claim 4, wherein the controller corrects the gradation value difference smaller than the threshold value so that the gradation value difference smaller than the threshold value is the threshold value in the case where a sum of the gradation value difference smaller than the threshold value and the other gradation value differences is larger than a sum when the gradation value difference smaller than the threshold value and the other gradation value differences are all the threshold value.

6. The image processing apparatus according to claim 4, wherein the controller corrects the gradation value difference smaller than the threshold value so that at least one of the other gradation value differences larger than the threshold value reach the threshold value in the case where a sum of the gradation value difference smaller than the threshold value and the other gradation value differences is smaller than a sum when the gradation value difference smaller than the threshold value and the other gradation value differences are all the threshold value and the at least one of the other gradation value differences is larger than the threshold value.

7. The image processing apparatus according to claim 4, wherein the controller further corrects the gradation value difference smaller than the threshold value so that the gradation value difference smaller than the threshold value and the other gradation value differences are all equal in the case where the gradation value difference smaller than the threshold value and the other gradation value differences are all smaller than the threshold value and the gradation value difference smaller than the threshold value is smaller than the other gradation value differences.

8. The image processing apparatus according to claim 4, wherein the controller corrects the gradation value difference smaller than the threshold value so that the gradation value difference smaller than the threshold value and one of the other gradation value differences are equal in the case where the gradation value difference smaller than the threshold value and the other gradation value differences are all smaller than the threshold value and the other of the other gradation value differences is smaller than the gradation value difference smaller than the threshold value.

9. The image processing apparatus according to claim 1, wherein the controller corrects the gradation value difference smaller than the threshold value by correcting at least one of two gradation values of the gradation value difference smaller than the threshold value.

10. The image processing apparatus according to claim 1, wherein the controller is further configured to:
calculate a gradation value difference between gradation values adjacent in order sorted by the sort unit.

11. The image processing apparatus according to claim 1, wherein the controller is further configured to:
extract color values of the color data; and
convert the extracted color values into gradation values of the grayscale data.

12. The image processing apparatus according to claim 11, wherein the controller is further configured to:
create a color-gray conversion table based on the corrected gradation values and the color values of the color data.

13. The image processing apparatus according to claim 11, wherein the controller is further configured to:
change the threshold value according to a number of the color values in the case where the number of the color values is different from a prescribed number.

14. The image processing apparatus according to claim 11, wherein the controller is further configured to:
calculate the gradation values by weighting and combining the color values.

15. The image processing apparatus according to claim 1, wherein the threshold value is a reference value for discrimination between the gradation values of the grayscale data.

16. The image processing apparatus according to claim 1, wherein in the sorted plurality of gradation values, the at least one second gradation value difference is adjacent to the first gradation value difference.

17. An image processing method comprising:
converting color data included in an image into grayscale data;
sorting a plurality of gradation values of the grayscale data after the conversion, wherein the plurality of gradation values are sorted in order of magnitude;
responsive to a determination that a first gradation value difference among the plurality of gradation value differences between adjacent gradation values in the sorted plurality of gradation values is smaller than a threshold value, correcting at least one gradation value so that the first gradation value difference is not less than the threshold value; and
correcting at least one gradation value different from the corrected gradation value so that at least one second gradation value difference different from the first gradation value difference among the plurality of gradation value differences is reduced;
wherein a sum of the correction amounts for the at least one second gradation value difference is equal to the correction amount for the first gradation value difference, and each of the at least one second gradation value difference is greater than or equal to the threshold value.

18. A non-transitory computer readable storing medium storing a program for causing a computer to execute an image processing method, the method comprising:
converting color data included in an image into grayscale data;
sorting a plurality of gradation values of the grayscale data after the conversion, wherein the plurality of gradation values are sorted in order of magnitude;
responsive to a determination that a first gradation value difference among the plurality of gradation value differences between adjacent gradation values in the sorted plurality of gradation values is smaller than a threshold value, correcting at least one gradation value so that the first gradation value difference is not less than the threshold value; and
correcting at least one gradation value different from the corrected gradation value so that at least one second gradation value difference different from the first gradation value difference among the plurality of gradation value differences is reduced;
wherein a sum of the correction amounts for the at least one second gradation value difference is equal to the correction amount for the first gradation value difference, and each of the at least one second gradation value difference is greater than or equal to the threshold value.

* * * * *